United States Patent
Zhang et al.

(10) Patent No.: US 9,252,681 B2
(45) Date of Patent: Feb. 2, 2016

(54) POWER CONVERTER WITH A FIRST STRING HAVING CONTROLLABLE SEMICONDUCTOR SWITCHES AND A SECOND STRING HAVING SWITCHING MODULES

(71) Applicant: General Electric Company, Schenectady, NY (US)

(72) Inventors: Di Zhang, Niskayuna, NY (US); Luis José Garcés, Niskayuna, NY (US); Andrew Allen Rockhill, Mechanicville, NY (US); Rixin Lai, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 265 days.

(21) Appl. No.: 14/014,516

(22) Filed: Aug. 30, 2013

(65) Prior Publication Data
US 2015/0062991 A1    Mar. 5, 2015

(51) Int. Cl.
*H02M 7/483*    (2007.01)
*H02M 7/537*    (2006.01)
(Continued)

(52) U.S. Cl.
CPC .............. *H02M 7/537* (2013.01); *H02M 7/487* (2013.01); *H02M 7/5152* (2013.01); *H02M 7/7575* (2013.01); *H02M 2001/0003* (2013.01); *H02M 2007/4835* (2013.01)

(58) Field of Classification Search
CPC ................ H02M 2007/4835; H02M 7/483; H02M 7/49; H02M 2001/0077; H02M 2001/0067
See application file for complete search history.

(56) References Cited

U.S. PATENT DOCUMENTS

| | | | |
|---|---|---|---|
| 5,532,575 | A | 7/1996 | Ainsworth et al. |
| 7,835,166 | B2 | 11/2010 | Hiller |

(Continued)

FOREIGN PATENT DOCUMENTS

| | | |
|---|---|---|
| DE | 10103031 A1 | 7/2002 |
| EP | 2323249 A1 | 5/2011 |

(Continued)

OTHER PUBLICATIONS

Zhao et al. "Research on Submodule Capacitance Voltage Balancing of MMC Based on Carrier Phase Shifted SPWM Technique", China International Conference on Electricity Distribution (CICED), IEEE, Sep. 13, 2010, pp. 1-6.

(Continued)

*Primary Examiner* — Harry Behm
(74) *Attorney, Agent, or Firm* — Nitin N. Joshi (57) ABSTRACT

A power converter includes at least one leg including a first string that includes controllable semiconductor switches, a first connecting node, and a second connecting node and that is operatively coupled across a first bus and a second bus. A second string is operatively coupled to the first string via the first connecting node and the second connecting node. The second string includes a plurality of switching modules wherein each of the plurality of switching modules includes a plurality of fully controllable semiconductor switches and at least one energy storage device. The power converter includes a system controller to control activation of the controllable semiconductor switches and switching modules such that a controlled electrical variable is maintained at a first predetermined reference voltage value and the average internal stored energy of the energy storage devices is maintained at a second predetermined reference value.

10 Claims, 6 Drawing Sheets

(51) Int. Cl.
*H02M 7/487* (2007.01)
*H02M 7/515* (2007.01)
*H02M 7/757* (2006.01)
*H02M 1/00* (2007.01)

(56) References Cited

U.S. PATENT DOCUMENTS

| | | | |
|---|---|---|---|
| 7,960,871 | B2 | 6/2011 | Dommaschk et al. |
| 8,144,489 | B2 | 3/2012 | Dommaschk et al. |
| 8,233,300 | B2 | 7/2012 | Dommaschk et al. |
| 8,294,306 | B2 | 10/2012 | Kumar et al. |
| 8,385,097 | B2 | 2/2013 | Asplund |
| 8,390,259 | B2 | 3/2013 | Dommaschk et al. |
| 8,400,796 | B2 | 3/2013 | Doefnaes et al. |
| 2011/0019449 | A1 | 1/2011 | Katoh et al. |
| 2013/0094260 | A1* | 4/2013 | Martini .............. H02M 7/483 363/97 |

FOREIGN PATENT DOCUMENTS

| | | | | |
|---|---|---|---|---|
| EP | 1927183 | B1 | 6/2011 | |
| EP | 2713495 | A2 | 4/2014 | |
| EP | 2755315 | A1 | 7/2014 | |
| NZ | WO2013137749 | A1* | 9/2013 | ............ H02M 7/497 |
| WO | 9614686 | A1 | 5/1996 | |
| WO | 2011124258 | A1 | 10/2011 | |
| WO | 2011124260 | A1 | 10/2011 | |
| WO | 2011127980 | A1 | 10/2011 | |
| WO | 2012016592 | A1 | 2/2012 | |
| WO | 2013135277 | A1 | 9/2013 | |

OTHER PUBLICATIONS

Merlin et al. "A New Hybrid Multi-Level Voltage-Source Converter with DC Fault Blocking Capability", 9th IET International Conference on AC and DC Power Transmission (ACDC 2010), Oct. 19, 2010, pp. 1-5.

Munch et al. "Integrated Current Control, Energy Control and Energy Balancing of Modular Multilevel Converters", 36th Annual Conference on IEEE Industrial Electronics Society IECON 2010, Nov. 7, 2010, pp. 150-155, NJ, USA.

Perez et al. "Decoupled Current Control of Modular Multilevel Converter for HVDC Applications", IEEE International Symposium on Industrial Electronics (ISIE), May 28, 2012, pp. 1979-1984.

European Search Report and Written Opinion issued in connection with corresponding EP Application No. 14181541.5-1809 on Dec. 1, 2014, 12 pages.

Xiaoqian et al., "Capacitor Voltage Balancing Control Based on CPS-PWM of Modular Multilevel Converter", Energy Conversion Congress and Exposition (ECCE), 2011 IEEE, Issue Date: Sep. 17-22, 2011, Print ISBN: 978-1-4577-0542-7, pp. 4029-4034.

* cited by examiner

POWER CONVERTER WITH A FIRST STRING HAVING CONTROLLABLE SEMICONDUCTOR SWITCHES AND A SECOND STRING HAVING SWITCHING MODULES

BACKGROUND

The invention relates generally to power converters and more specifically to multilevel configurations of converters.

The utility and importance of power conversion has grown with advantages being achieved in applications such as motor drives, renewable energy systems, and high voltage direct current (HVDC) systems, for example. The multilevel converter is emerging as a promising power conversion technology for various medium and high voltage applications.

Multilevel converters offer several advantages over conventional two-level converters. For example, the power quality and efficiency of the multilevel converter is better than that of two level converters. Also, multilevel converters are ideal for interfacing between a grid and renewable energy sources such as photovoltaic (PV) cells, fuel cells, and wind turbines. Transformer-less multilevel converters have been designed using a modular structure. Such multilevel converters typically include a plurality of power modules that are coupled between DC buses. The modular structure of the converters allows stacking of these converters to provide different power and voltage levels.

Multilevel power converters typically include a plurality of semiconductor switches and energy storage devices that are placed between the input and output terminals. The semiconductor switches and energy storage devices in the converter aid in providing regulated output power at the output terminals. The output power at the output terminals is dependent on the activation of the semiconductor switches and energy present in the energy storage devices.

Control systems and methods have been designed to activate the semiconductor switches such that the output power is maintained at a desired level while voltage observed across the dc bus is maintained at a substantially constant level.

A topology for a multilevel power converter is described in commonly assigned U.S. application Ser. No. 13/629,882, filed 12 Sep. 2012, which is herein incorporated by reference. It would be desirable to have a control system and method to most efficiently and effectively operate such a topology.

BRIEF DESCRIPTION

In one embodiment of the present invention, a power converter is provided. The power converter includes at least one leg. Each leg includes a first string that includes controllable semiconductor switches, a first connecting node, and a second connecting node. The first string is operatively coupled across a first bus and a second bus. Each leg includes a second string operatively coupled to the first string via the first connecting node and the second connecting node. The second string comprises a plurality of switching modules wherein each of the plurality of switching modules comprises a plurality of fully controllable semiconductor switches and at least one energy storage device. The power converter includes system controller to control activation of the controllable semiconductor switches and switching modules such that a controlled electrical variable is maintained at a first predetermined reference voltage value and an average internal stored energy of the energy storage devices is maintained at a second predetermined reference value.

In another embodiment of the present invention, a method for power conversion is provided. The method includes determining a plurality of intermediate reference values based on a first predetermined reference value. The method further includes determining a second predetermined reference value based on a total internal stored energy in a power converter and the first predetermined reference value. Furthermore, the method includes generating activation commands for a plurality of semiconductor switches and switching modules in the power converter based on the plurality of intermediate reference values and the second predetermined reference value. The method further includes activating the plurality of semiconductor switches and switching modules such that a controlled electrical variable is equal to the first predetermined reference value and an average internal stored energy in the power converter is equal to the second predetermined reference value.

DRAWINGS

Other features and advantages of the present disclosure will be apparent from the following more detailed description of the preferred embodiment, taken in conjunction with the accompanying drawings which illustrate, by way of example, the principles of certain aspects of the disclosure.

DETAILED DESCRIPTION

Reference will be made below in detail to exemplary embodiments of the invention, examples of which are illustrated in the accompanying drawings. Wherever possible, the same reference numerals used throughout the drawings refer to the same or like parts.

As will be described in detail hereinafter, various embodiments of an exemplary system for power conversion are provided. Various embodiments of the power converter provide for a multilevel converter. The term multilevel converter, as used herein, is used to refer to a converter that includes multiple levels of switches connected to different phases of one form of input voltage/current and converts the input voltage/current to another form of output voltage/current.

Figure 1:
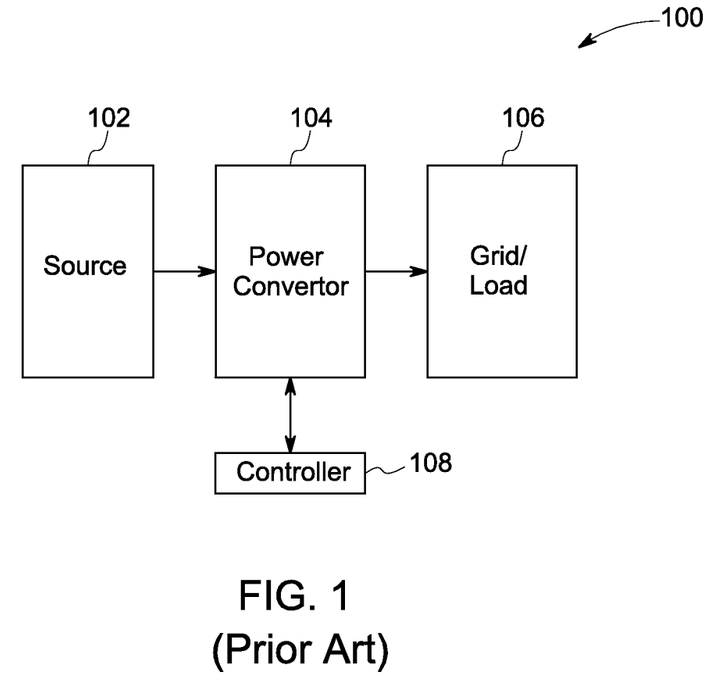
FIG. 1 is a diagrammatical representation of a system for power conversion.

FIG. 1 depicts a system 100 for converting power. In one embodiment, the system 100 for converting power may include a source 102, a power converter 104, and a grid/utility/load 106. The term source, as used herein, may comprise a renewable power source, a non-renewable power source, a generator, or a grid, for example. In another possible configuration, the source may comprise another power converter. The term load, as used herein, may be used to refer to a grid, a machine, or an electrical appliance, for example. The power converter 104 comprises a multilevel converter.

The system 100 further includes a controller 108 configured to control the operation of the power converter 104. By way of example, the controller 108 may be configured to control the operation of the power converter 104 by controlling switching of a plurality of semiconductor switches of the power converter 104. Furthermore, in one embodiment, the system 100 may also include other circuit components (not shown) such as, but not limited to, a transformer, a circuit breaker, an inductor, a compensator, a capacitor, a rectifier, a reactor, and a filter.

The power converter 104, according to certain embodiments, may include legs that are coupled between DC-link buses that are configured to transmit power from the source to a load terminal. The legs of the power converter 104 are configured such that regulated power is supplied from the source to the terminal.

Figure 2:
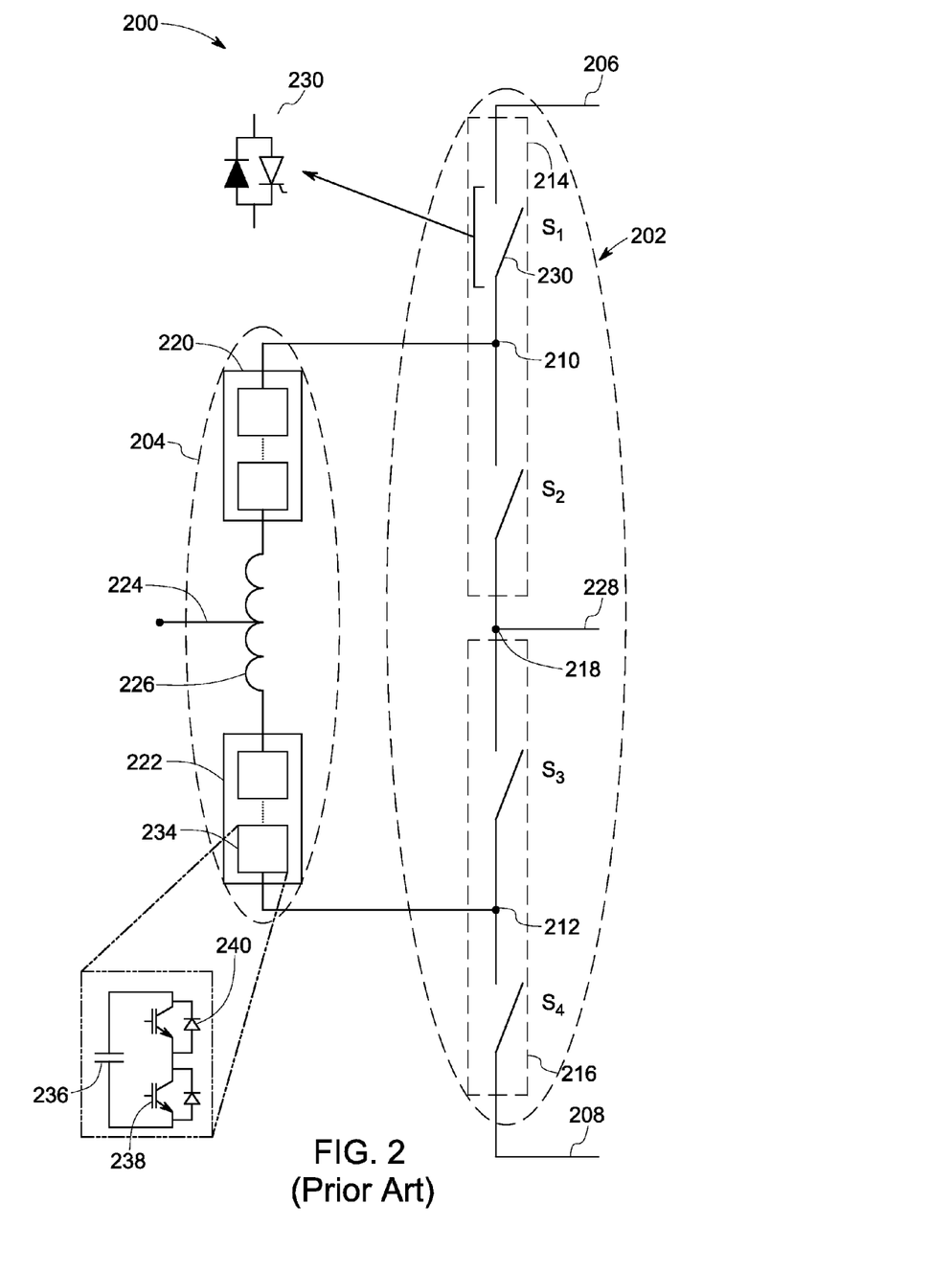
FIG. 2 is a diagrammatical representation of an exemplary embodiment of a portion of a power converter.

In FIG. 2, a diagrammatical representation a leg 200 of a power converter is depicted. The leg 200 of the power converter may include a first string 202 and a second string 204. More particularly, the first string 202 may be operatively coupled to the second string 204 to form the leg 200. Furthermore, the first string 202 may be operatively coupled between a first bus 206 and a second bus 208. In one embodiment, the first bus 206 may include a positive DC bus, and the second bus 208 may include a negative DC bus. The first string 202 may be operatively coupled to the second string 204 via a first connecting node 210 and a second connecting node 212. Also, the first string 202 may include a first branch 214 operatively coupled to a second branch 216 via a third connecting node 218. Similarly, the second string 204 may include a first arm 220 operatively coupled to a second arm 222 via an AC phase 224 and an inductor 226. The third connecting node 218 may be operatively coupled to a third bus 228. In the embodiment of FIG. 2, the third bus 228 may comprise a direct current bus and more particularly, a middle or center DC bus which may be at a negative potential with respect to the first bus 206 and at a positive potential with respect to the second bus 208.

The first string 202 may include a plurality of controllable semiconductor switches $S_1$, $S_2$, $S_3$, and $S_4$ (230). In the example of FIG. 2, the plurality of controllable semiconductor switches 230 may include partially controllable semiconductor switches. However, in another embodiment, the plurality of controllable semiconductor switches may alternatively include fully controllable semiconductor switches. Moreover, the plurality of controllable semiconductor switches may include a combination of partially controllable semiconductor switches and fully controllable semiconductor switches. Furthermore, in one example, the first branch 214 of the first string 202 may include two controllable semiconductor switches $S_1$ and $S_2$. Similarly, the second branch 216 of the first string 202 may include two controllable semiconductor switches $S_3$ and $S_4$. The controllable semiconductor switches $S_1$, $S_2$, $S_3$, and $S_4$ may include a power diode in combination with a thyristor, a silicon controlled rectifier, a gate turnoff thyristor, or an IGBT, for example.

The first arm 220 and the second arm 222 of the second string 204 may include a plurality of switching modules 234. The switching module 234 may be a combination of a plurality of fully controllable semiconductor switches 238 and at least one energy storage device 236. The fully controllable semiconductor switches 238 may include insulated gate bipolar transistors (IGBTs), metal oxide semiconductor field effect transistors (MOSFETs), other types of field effect transistors (FETs), gate turn-off thyristors, insulated gate commutated thyristors (IGCTs), injection enhanced gate transistors (IEGTs), or combinations thereof. The materials of such switches may comprise silicon, silicon carbide, gallium nitride, or gallium arsenide, for example. The switching modules 234 in the first arm 220 and the second arm 222 are selected such that the voltage rating of the leg 200 is met and a minimum voltage step requirement of the power converter is fulfilled.

Each of the fully controllable semiconductor switches 238 may also include a power diode 240 that may be inbuilt and antiparallel to the fully controllable semiconductor switches. The inbuilt power diodes 240 may provide a freewheeling path. These power diodes 240 may also be referred to as freewheeling diodes.

In one non-limiting example, the energy storage device 236 may include a capacitor, an ultra-capacitor, a super conducting coil, a battery or any other storage element. In the example of FIG. 2, the fully controllable semiconductor switch 238 may be operatively coupled in series to the energy storage device 236.

The leg 200 may be employed in a single phase power converter, a two phase power converter, a three phase power converter, and other equivalent multiphase DC to AC, AC to DC or AC to AC power converters. The switching of the semiconductor switches in the first string 202 and the second string 204 may be controlled based on reference value for a controlled variable required at the output terminal. For example, the switches may be controlled to deliver required output power at the output terminals.

In some embodiments, a power converter with the leg 200 may be coupled with another power converter with leg 200 to create a back-to-back power conversion configuration.

Figure 3:
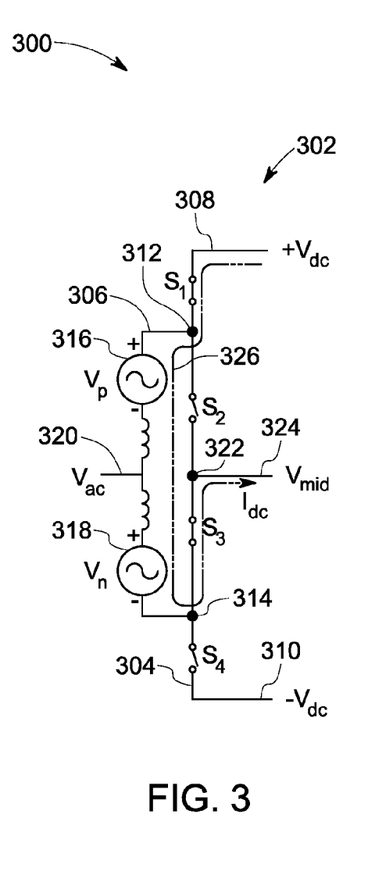
FIG. 3 is a diagrammatical representations of an exemplary switching pattern of controllable semiconductor switches in the power converter of FIG. 2.
Figure 4:
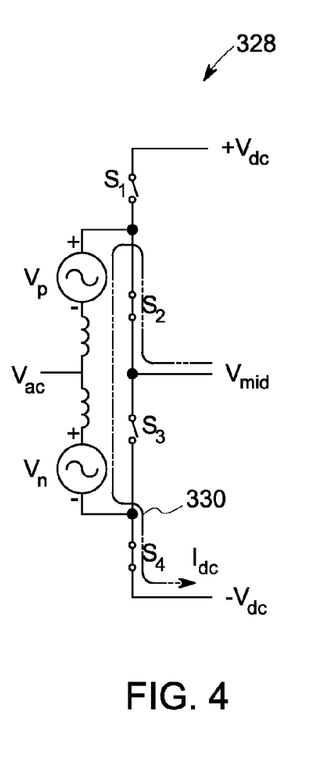
FIG. 4 is a diagrammatical representations of an exemplary switching pattern of controllable semiconductor switches in the power converter of FIG. 2.
Figure 5:
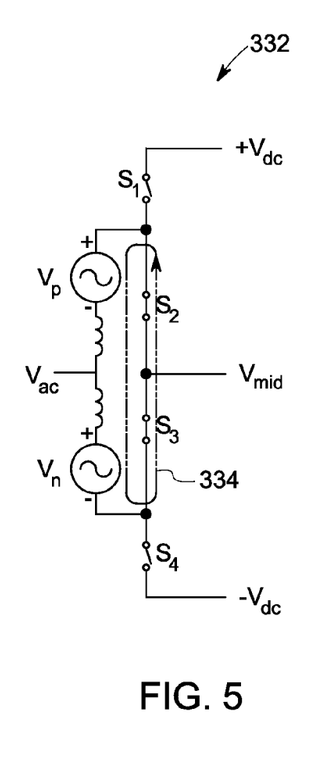
FIG. 5 is a diagrammatical representations of an exemplary switching pattern of controllable semiconductor switches in the power converter of FIG. 2.

FIGS. 3-5, depict diagrammatical representations 300, 400, and 500 of different states of a leg of a power converter, such as the leg 200 of FIG. 2, according to the aspects of the present disclosure. Referring to FIG. 3, a diagrammatical representation of a leg 302, such as the leg 200 of FIG. 2, in a first state of switching of the controllable semiconductor switches is presented. The first state may also be referred to as a positive state. The leg 302 may include a first string 304 and a second string 306. Also, the leg 302 may be operatively coupled between a first bus 308 and a second bus 310. As noted hereinabove, the first bus 308 may include a positive DC bus and the second bus 310 may include a negative DC bus. Furthermore, the first string 304 may be operatively coupled to the second string 306 via a first connecting node 312 and a second connecting node 314.

In addition, a first arm, such as the first arm 220 of FIG. 2 of the second string 306, and a second arm, such as the second arm 222 of FIG. 2 of the second string 306, may be represented by controllable voltage sources $V_p$ 316 and $V_n$ 318, respectively. As noted hereinabove, the second string 306 may include a plurality of switching modules (not shown). The first arm of the second string 306 and the second arm of the second string 306 may be operatively coupled via the fourth bus 320. Also, the first string 304 may include a third connecting node 322, which may be operatively coupled to a third bus 324. In the configuration of FIG. 2 the first string 304 includes four controllable semiconductor switches represented as $S_1$, $S_2$, $S_3$ and $S_4$. Additionally, the voltage at the first bus 308 may be represented as $+V_{dc}$, and the voltage at the second bus 310 may be represented as $-V_{dc}$. By way of example, the voltage of +$V_{dc}$ at the first bus 308 and the voltage of −$V_{dc}$ at the second bus 310 may be with respect to a virtual ground. In the illustrated embodiment, the voltages across the first bus 308 and the second bus 310 are measured with respect to the third bus 324. The voltage at the third bus 324 may be represented as $V_{mid}$.

As depicted in FIG. 3, during the first state of switching, the controllable semiconductor switches $S_1$ and $S_3$ are activated to allow current to flow therethrough, while the controllable semiconductor switches $S_2$ and $S_4$ are maintained in a deactivated state to prevent current from flowing therethrough. The activation of controllable semiconductor switches $S_1$ and $S_3$ provides a first current flow path 326 between the first bus 308 and the third bus 324 via a corresponding second string 306. Consequently, the second string 306 may be operatively coupled between the first bus 308 and the third bus 324 in the positive state. Furthermore, while the first current flow path 326 is established, the voltage across the first bus 308 and the third bus 324 may depend on the switching of the fully controllable semiconductor switches corresponding to the plurality of switching modules in the second string 306, such as the switching modules 334 of FIG. 3. The current flowing through the first current flow path 326 is represented as $I_{dc}$.

In a similar fashion, FIG. 4 is a diagrammatical representation 328 of a leg in a second state of switching of the controllable semiconductor switches. The second state of switching of the controllable semiconductor switches may also be referred to as a negative state. In the second state, the controllable semiconductor switches $S_2$ and $S_4$ may be activated, while controllable semiconductor switches $S_1$ and $S_3$ are deactivated. The activation of the controllable semiconductor switches $S_2$ and $S_4$ results in providing a second current flow path 330 between the third bus 324 and the second bus 310. Accordingly, the second string 306 may be operatively coupled between the second bus 310 and the third bus 324 in the negative state.

Similarly, FIG. 5 is a diagrammatical representation 332 of a leg in a third state of switching of the controllable semiconductor switches. The third state of switching of the controllable semiconductor switches may also be referred to as a zero state. In the third state, the controllable semiconductor switches $S_2$ and $S_3$ are activated, while the controllable semiconductor switches $S_1$, and $S_4$ are deactivated. The activation of the controllable semiconductor switches $S_2$ and $S_3$ results in providing a third current flow path 334. This third current flow path 334 may also be referred to as a freewheeling path. In addition, both ends of the second string 306 may be operatively coupled to each other via the activated controllable semiconductor switches $S_2$ and $S_3$ and the third bus 324. Although, FIGS. 3-5 represent the three states of switching with reference to a single leg, these three states of switching may be employed simultaneously for a plurality of legs in a two phase power converter, a three-phase power converter, and the like.

As depicted in FIGS. 3-5 at any instant in time, the second string 306 is operatively coupled between the first bus 308 and third bus 324, between the third bus 324 and the second bus 310, or both ends of the second string 306 may be operatively coupled to a third bus 324. Hence, the second string 306 may have to withstand a maximum voltage of value $V_{dc}$. Accordingly, for effective control of the power converter, the first arm of the second string 306 and the second arm of the second string 306 may each have to withstand a maximum voltage of $V_{dc}$.

In conventional modular multi-level converters, the branches of switching modules may have to handle the full DC voltage (2$V_{dc}$) appearing across the first bus and the second bus. Also, for control of the conventional power converter, the first portion and the second portion of the branches of the switching modules may each have to withstand a maximum voltage of 2$V_{dc}$. Hence, a required number of switching units and/or a required rating of the switching units will increase. The conventional modular multilevel converter (MMC) requires an increased number of switching units, thereby resulting in increased cost and complexity. On the other hand, the power converter with leg 200 requires the arm of the switching module to handle a maximum voltage of $V_{dc}$ thereby reducing the number of switching modules to handle the input power generated at the source.

Furthermore, the switching of the plurality of controllable semiconductor switches $S_1$, $S_2$, $S_3$, and $S_4$ of the first string 304 may operate in combination with the switching of the plurality of switching modules (not shown) in the second string 306. Also, as previously noted, the switching of the plurality of switching modules in the second string 306 may include activation and/or deactivation of the fully controllable semiconductor switches. The switching modules in the second string 306 and the switches in the first string 304 are controlled by the controller such that regulated power is provided at the load terminal while ensuring that the energy stored in the power converter is maintained at a constant level.

In a three-phase power converter, three legs 200 are connected in parallel between the first bus 206 and the second bus 208. The legs 200 are connected such that the first string 202 is coupled with the first bus 206 on one end and the second bus 208 on another end. Furthermore, the first string 202 of each leg 200 is coupled to the third bus 324. The voltage of the first bus 206 and the second bus 208 is measured with respect to the third bus 324. In the foregoing description, a three-phase converter has been utilized to explain the operations of the power converter. It may be understood that the operations of the power converter remain the same for single-phase converters as well as multi-phase converter with two legs 200 or more than three legs 200.

Figure 6:
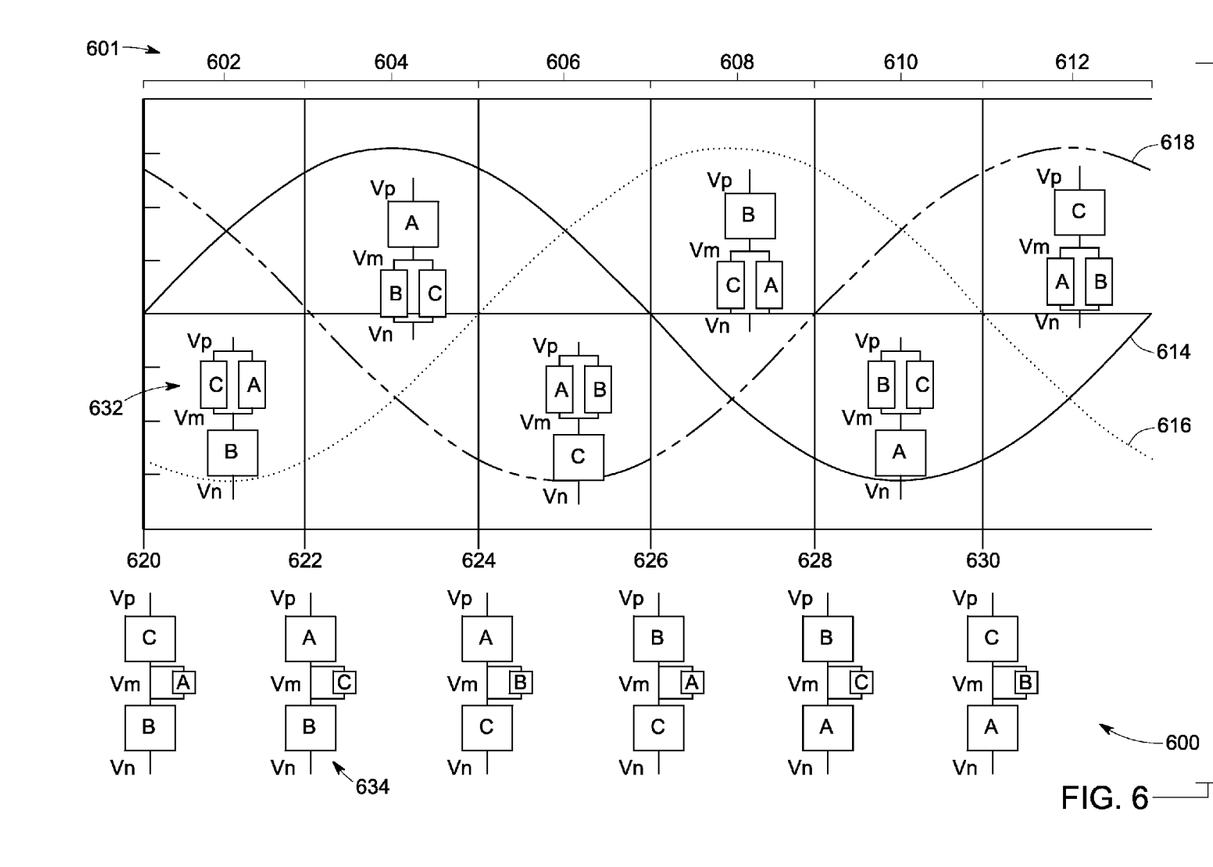
FIG. 6 is a diagrammatical representation of voltage waveforms corresponding to different states of three phases in one line cycle of the power converter of FIG. 2.

Referring to FIG. 6, a diagrammatical representation 600 of sinusoidal voltage output waveforms corresponding to the different states of a possible three AC phases configurations in one line cycle 601, according to the aspects of the present disclosure, is depicted. For ease of understanding, FIG. 6 representing a connection of three legs will be described with respect to FIGS. 3-5. In one embodiment, the line cycle with a phase sequence A-B-C 601 may be partitioned into six sections 602, 604, 606, 608, 610, 612. In the example of FIG. 6, voltage waveforms corresponding to the AC three phases A, B, and C are presented. The voltage waveforms corresponding to the three phases include a first voltage waveform 614 corresponding to AC phase-A, a second voltage waveform 616 corresponding to AC phase-B, and a third voltage waveform 618 corresponding to AC phase-C.

The control system and method, according to certain embodiments, provides for switching patterns in the six sections 602, 604, 606, 608, 610, and 612 to generate desired outputs. The controller, for example, the controller 108, is configured to determine the switching pattern such that the value of a controlled variable is obtained while satisfying the condition of maintaining the average system internal stored energy at a constant level. The method for determination of the switching pattern by the controller 108 will be explained in greater detail with FIGS. 7 and 8. During a portion of the line cycle 601 corresponding to each section the section may have one or two legs connected to the first bus 206, the second bus 208, or the third bus 228. When the leg is connected to the first bus 206 (the positive bus) it is said to be in positive state, whereas when the leg is connected to the second bus 208 (the negative bus) it is said to be in negative state. When the leg is connected to the third bus 228 it is said to be in a zero state. Furthermore, the line cycle 601 of the three AC phases may include six transient zones 620, 622, 624, 626, 628, and 630. The term transient zone, as used herein, is used to refer to a zone during which at least one of the legs of the power converter, such as the leg 200, transitions from one state to another. In one non-limiting example, at the transient zone 622, the state of the leg associated with AC phase C changes from a positive state to a negative state. During the transient state, the leg is not connected to the positive or negative bus, with its terminals short-circuited as shown in the figures.

Furthermore, during a transition between two adjacent sections, one of the legs may be in the positive state, while another leg may be in the negative state, and yet another leg may be in the zero or transient state. In particular, in the section 602, the leg associated with AC phase A and the leg associated with AC phase C are in the positive state, while the leg associated with AC phase B is in the negative state. Also, the leg associated with AC phase A and the leg associated with AC phase C may be operatively coupled in parallel to each other between the first bus and the third bus. Particularly, the second string associated with the AC phase-A and the second string associated with the AC phase-C may be operatively coupled in parallel to each other between the first bus and the third bus through the activated switches $S_1$ and $S_3$ of the corresponding first strings of the AC phase-A and AC Phase-C. Moreover, the leg associated with AC phase B may be operatively coupled between the third bus 228 and the second bus 208. In particular, the switches $S_2$ and $S_4$ corresponding to the first string associated with AC phase B may be activated. Accordingly, the leg associated with AC phase A and the leg associated with AC phase C may be operatively coupled in parallel to each other and further operatively coupled in series to the leg associated with AC phase B, as indicated by reference numeral 632.

With continuing reference to FIG. 6, the section 602 is followed by the transient zone 622. At the transient zone 622, the leg associated with AC phase A continues to be in the positive state and the leg associated with AC phase B continues to be in negative state. However, the leg associated with AC phase C transitions from the positive state to the zero state, as indicated by reference numeral 634. The switches $S_2$ and $S_3$ of the first string associated with AC phase C may be activated. Consequently, when the leg associated with AC phase C is in the zero state, both ends of the leg may be operatively coupled to the third bus 228.

In the transient zone 622, the switch $S_1$ corresponding to the first string associated with AC-phase C may be deactivated and the switch $S_2$ corresponding to the first string associated with AC-phase C may be activated. Switch $S_2$ may be activated by applying a gate trigger signal. Also, at section 602, as previously noted, the leg associated with AC phase A and the leg associated with AC phase C may be operatively coupled in parallel to each other between the first bus and the third bus through the corresponding activated switches $S_1$ and $S_3$. Therefore, the DC current on the first bus is shared by the leg associated with AC phase A and the leg associated with AC phase C. Accordingly, the DC current on the first bus is shared by the switches $S_1$ and $S_3$ of the first string associated with AC phase A and the switches $S_1$ and $S_3$ of the first string associated with AC phase C. The deactivation of switch $S_1$ corresponding to first string associated with AC phase C may be achieved by reducing the current to a near zero value in the first string associated with AC phase C. Furthermore, the reduction of the current to the near zero value in the first string associated with AC phase C may be achieved by employing a controller such as the controller 108 of FIG. 1.

Figure 7:
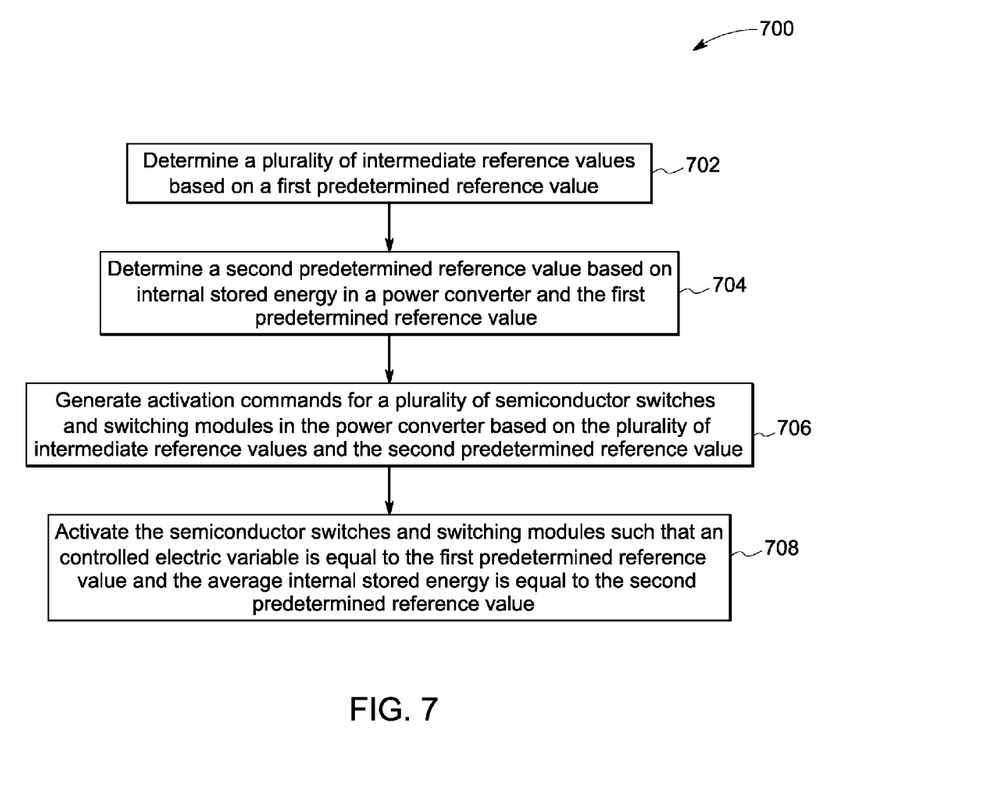
FIG. 7 is a flow chart representing an exemplary method for power conversion, according to aspects of the present disclosure.

The controller 108 is configured to employ the method illustrated in FIG. 7 to control the switching pattern of the semiconductor switches and the switching modules such that the electrical variable to be dynamically controlled, such as the output power, output current or other is maintained at a first reference value. For example, the electrical variable that is dynamically controlled may comprise an output power observed at the output terminals of the power converter. The controller 108 is configured to control the switching pattern of the switches in the converter such that the measured value of output power is gradually driven towards the first reference value. The method also enables the controller 108 to manage energy stored in energy storage devices, for example energy storage device 236, such that the average internal stored energy in the power converter is maintained at a second predetermined reference value. The second predetermined reference value, according to certain embodiments, is provided by an operator of the power converter. In other embodiments, the second predetermined reference value is determined based on the measured value of the controlled electrical variable and the first reference value.

The method includes determining, at step 702, a plurality of intermediate reference values based on the first predetermined reference value for the power converter. For example, the first predetermined reference value for the power converter, as illustrated in FIG. 2, may be a desired level of output power at an output terminal. The intermediate reference values determined at step 702 may include, but are not limited to, voltage across the first bus 206 and the second bus 208 with respect to the third bus 228 ($V_{dc}^*$), reference value for voltage at each leg of the converter ($V_a^*, V_b^*,$ and $V_c^*$), voltage reference value for the third bus 228 ($V_{mid}^*$), and a balance voltage value ($\Delta V^*$) required to maintain a voltage difference in the first arm 220 and second arm 222 of the second string 208 of the power converter.

The power converter illustrated in FIG. 2, may be utilized to convert AC input into DC output, as well as to convert DC input to AC output. In one embodiment, the first predetermined reference value can be provided as an input to the controller 108 by an operator. In another embodiment, the controller 108 determines the first predetermined reference value based on the total internal stored energy in the energy storage devices, such as the energy storage device 236 present in each of the switching modules 234.

Further, at step 704, the method includes determining the second predetermined reference value based on the first predetermined reference value and the total internal stored energy in the power converter. The power converter, during operation, utilizes part of the energy stored in the energy storage devices 236 of the switching modules 234 together with power received from or sent to the first bus 206 and second bus 208 to keep the controlled electrical variable at the output AC terminals equal to the first predetermined reference value. For regulated operations, the controller 108 is configured to maintain energy stored in the power converter at a constant level. For example, the total stored energy in the power converter is maintained at the second predetermined reference value. The controller 108 continuously computes the total energy stored in each energy storage device associated with the power converter. The total internal energy and the first predetermined reference value are utilized to determine an amount of energy that may be utilized by the power converter to meet the first predetermined reference value. Based on the determination of possible consumption of energy stored in the energy storage devices 236 to meet the first predetermined reference value requirement, an average of the total internal storage energy in the power converter may be determined as the second predetermined reference value.

At step 706, activation commands are generated by the controller 108 based on the first predetermined reference value; the second predetermined reference value, and the plurality of intermediate reference values. The activation commands pertain to gating signals for the plurality of semiconductor switches ($S_1$, $S_2$, $S_3$, and $S_4$) and the plurality of switching modules 234. The gating signals are generated such that the power converter operates in accordance with the modes described along with FIGS. 3-5.

Further, at step 708, the semiconductor switches $S_1$-$S_4$, and the switching modules 234 are provided with the gating signals for activation in such a way that the controlled electrical variable measured at the output terminals of the converter is equal to the first predetermined reference value and the average internal stored energy in the converter is maintained at the second predetermined reference value.

The method for control of the power converter, according to certain embodiments, also includes generating a third reference value ($V_{mid}^*$) for voltage observed across the third bus 228 ($V_{mid}$). The third reference value is computed based on a difference between energy stored in each leg 200 of the converter. The controller 108 computes a total energy stored in energy storage devices 236 of each second string 208 in the legs 200 of the converter. Further, the controller 108 is configured to determine a difference between the energy stored in each leg 200, and regulate the third reference value. The third reference value is set such that the leg with maximum energy is utilized to make the controlled electrical variable equal to the first predetermined reference value while ensuring that the average internal stored energy is maintained at the second predetermined reference value. The controller 108 sets the third reference value based on a mode in which the converter is operating and a direction of current flow in the converter. For example, when the converter is operating in mode 634 (FIG. 6), and the Phase A leg has more energy than Phase C, the third predetermined reference value for the third bus 228 is set such that energy delivered by Phase A is greater than that delivered by Phase C to drive the stored energy difference between the two to zero. The energy delivered from Phase A contributes to maintaining the controlled electrical variable, for example the output power, at the first predetermined reference value. In another embodiment, during operation of the converter if more than one leg of the converter is connected to the first bus 206 or the second bus 208 in parallel, an average energy of the legs connected in parallel is compared with the average energy stored in the other legs to determine the third predetermined reference value.

Further, in the method for control of the power converter, the controller 108 is configured to control the activation of the plurality of switching modules such that energy between two legs connected in parallel is also balanced. The controller 108 is configured to generate a reference value for current flowing between the two legs connected in parallel. The reference value for the current defines energy transfer between the legs connected in parallel. The controller 108 determines the reference value based on a difference in energy stored in each of the legs connected in parallel. Further, the method also includes determining a current mode of operation of the converter. Based on the current mode of operation of the converter, the current flowing between the legs is controlled to approach the reference value for current. The controller 108 controls a circulating current flowing between the legs in parallel to approach the reference value such that some energy from the leg with more energy is transferred to the leg with less energy.

Furthermore, according to certain embodiments, the method includes balancing energy in the arms 220 and 222 of each leg 200. To achieve the balance between the arms 220 and 222, output voltage of each of these arms is regulated. The output voltage of the arms is regulated by providing an activation command to the switching modules that is equivalent to a difference between voltages at energy storage devices 236 in each of the arms 220 and 22 and a reference voltage value for the first bus 206 and the second bus 208. The reference voltage value for the first bus 206 and the second bus 208 is utilized to maintain the voltage on the first bus 206 and the second bus 208 to a constant level such that the controlled electrical variable is maintained at the first predetermined reference value.

Figure 8:
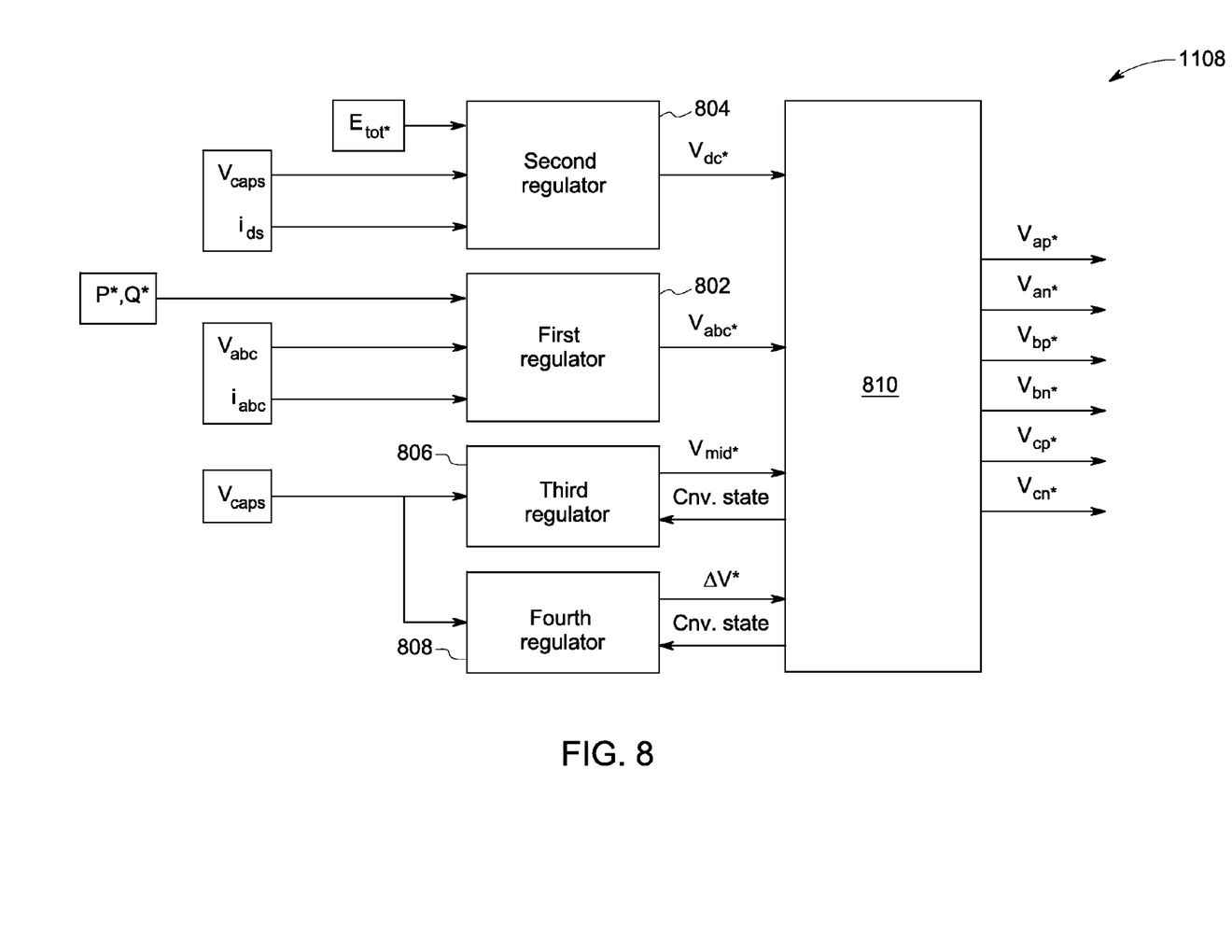
FIG. 8 is a diagrammatical representation of a system for controlling operations of the power converter of FIG. 2, according to aspects of the present disclosure.

The controller 1108, described in greater detail with FIG. 8, is configured to implement the above-described method and its embodiments to generate regulated power at output terminals of the power converter.

FIG. 8 illustrates a block diagram of the controller 1108 configured to control operations of a power converter, such as the power converter with leg 200. The controller 1108 of FIG. 8, according to the illustrated embodiment, is utilized to control a three-phase converter with three legs 200 connected in parallel between the first bus 206 and the second bus 208.

According to embodiments of the present invention, the controller 1108 is configured to control the activation state of semiconductor switches 230 and the switching modules 234 such that the controlled electrical variable, for example the output power, observed at the output terminals of the power converter is maintained at a first predetermined reference value, while ensuring that the average internal stored energy of the converter is maintained at a second predetermined reference value.

The controller 1108, as illustrated in FIG. 8, includes a first regulator 802 that is configured to generate activation commands for the plurality of semiconductor switches 230 and the switching modules 234 based on the first predetermined reference value. The first predetermined reference value pertains to the controlled electrical variable for the power converter. For example, the first predetermined reference value may be the real and reactive power requirements at the output terminal of the power converter. For example, the power converter may be configured to deliver 10 Mega Watts of power to a load. However, when a load connected at the output terminal of the power converter requires more power, the first predetermined reference value changes from 10 Mega Watts to the new requirement of the load. The first predetermined reference value, according to one embodiment, is provided to the regulator 802 by a system operator. In some other embodiments, the first predetermined reference value may be determined by the regulator 802 based on requirements at the output terminal.

When the controller 1108 is configured to control output power delivered by the power converter, the first regulator 802 is configured to determine a present power delivered by the converter from the voltages observed across the legs 200 of the power converter and the current flowing through the legs 200. The present power is compared with the first predetermined reference value to generate an error signal. The error signal is then utilized by the controller 1108 to generate intermediate reference values for leg voltages and currents. The first regulator 802 is configured to compute a difference between the total internal stored energy of the energy storage devices 236 and the second predetermined reference value.

The error between the stored energy and the second predetermined reference value and the error between the controlled electrical variable and the first predetermined reference value is utilized to determine the intermediate reference values. The intermediate reference values are utilized to generate activation commands for the plurality of switching modules 234 and the semiconductor switches 230. The controller 1108 is further configured to provide the activation commands to the switches 230 and the modules 234 to activate legs 200 such that voltage and current measured in each leg is equal to the intermediate reference values.

The controller 1108 also includes a second regulator 804. The second regulator 804 is configured to maintain the average internal stored energy of the power converter at second predetermined reference value. The modules 234 of the power converter include energy storage devices 236. The energy storage device 236 is configured to store energy during the operation of the power converter and deliver the stored energy such that the power requirements of the load connected at the output terminal are met. To maintain the total stored energy in the power converter at the second predetermined reference value, the controller is configured to activate switching modules 234 such that energy storage devices 236 associated with them are either charged or discharged. The second regulator 804 is configured to compare present total internal stored energy in each energy storage device 236 of the converter with the second predetermined reference value to generate an error signal. The error signal is utilized to generate activation commands for the switching modules 234 such that energy is utilized from energy storage devices 236 that have more energy stored than other energy storage devices 236 in the converter. Further, the error signal is utilized to generate an intermediate reference value for a voltage to be maintained across the first bus 206 and the second bus 208 with respect to the third bus 228.

The second regulator 804 can also be configured to generate a first predetermined reference value from the error signal that is generated from the comparison between present total internal stored energy and the second predetermined reference value.

The controller 1108 further includes a third regulator 806 that is configured to maintain equal distribution of energy between different legs 200 of the power converter. The third regulator 806 is configured to compute the present total stored energy in each leg 200 of the power converter based on energy stored in each of the energy storage devices 236. The third regulator 806 is further configured to compare energy stored in each of the legs 200. Based on a mode of operation of the power converter and flow of current in the power converter, the third regulator generates a third predetermined reference value for a voltage across the third bus 228. The activation commands generated by the third regulator 806 are utilized to activate plurality of switches and switching modules such that the voltage on the third bus 228 is equal to the third predetermined reference value. The third predetermined value is selected such that a leg 200 with maximum power is utilized to provide power to the output terminal of the converter. Power is received from the leg 200 with maximum power such that output power of the converter is equal to the first predetermined reference value, the average internal stored energy of the converter is maintained at the second predetermined reference value, and the energy in each leg 200 of the power converter is balanced.

The controller 1108 also includes a fourth regulator 808 that is configured to maintain energy balance between the first arm 220 and the second arm 222 of the leg 200. The fourth regulator 808 is configured to utilize energy difference between the arms 220 and 222 to generate a phase arm balance reference voltage that is utilized to drive a current in the leg 200 such that energy is balanced between the first arm 220 and the second arm 222.

The activation commands generated by the first regulator 802, the second regulator 804, the third regulator 806, and the fourth regulator 808 are provided to a modulator 810. The modulator 810 is configured to provide digital activation signals to the plurality of semiconductor switches 230 and the switching modules 234 such that the output power is maintained at the first predetermined reference value while maintaining the internal stored energy at the second predetermined reference value.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person of ordinary skill in the art to practice the embodiments of invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system for power conversion, without departing from the spirit and scope of the invention herein involved, it is intended that all of the subject matter of the above description or shown in the accompanying drawings shall be interpreted merely as examples illustrating the inventive concept herein and shall not be construed as limiting the invention.

The invention claimed is:

1. A power converter, comprising:
   at least one power converter leg, each leg comprising:
   a first string comprising a plurality of controllable semiconductor switches, a first connecting node, and a second connecting node, wherein the first string is operatively coupled across a first bus and a second bus; and
   a second string operatively coupled to the first string via the first connecting node and the second connecting node, wherein the second string comprises a plurality of switching modules, wherein each of the plurality of switching modules comprises a plurality of fully controllable semiconductor switches and at least one energy storage device;
   a system controller configured to control an activation mode of at least one of the plurality of controllable semiconductor switches from the first string, and a predetermined number of switching modules from the second string such that a controlled electrical variable is maintained at a first predetermined reference voltage value and the average internal stored energy of the energy storage devices are balanced and maintained at a second predetermined reference value;
   wherein the second string comprises a first arm and a second arm; and
   wherein the system controller further comprises:
   a first regulator for generating activation commands for the plurality of semiconductor switches and the switching modules based on the first predetermined reference value;
   a second regulator for generating activation commands for the plurality of switching modules based on internal stored energies of the energy storage devices to maintain the internal stored energies of the energy storage devices at the second predetermined value;
   a third regulator for maintaining an equal distribution of total stored energy among each of the plurality of legs; and
   a fourth regulator for maintaining an equal distribution of energy stored in each leg between the first and second arms of the second string of the leg.

2. The power converter of claim 1, wherein the controllable semiconductor switches of the first string comprise partially controllable switches.

3. The power converter of claim 1, wherein the first string comprises a first branch and a second branch, and wherein the second branch is operatively coupled to the first branch via a third connecting node.

4. The power converter of claim 3, wherein the third connecting node of each leg is connected to a third bus comprising a DC bus.

5. The power converter of claim 1, wherein the first and second arms of the second string are operatively coupled to a fourth bus.

6. The power converter of claim 5, wherein the fourth bus comprises an alternating current phase.

7. The power converter of claim 1, wherein the system controller further comprises a modulator configured to control the activation mode of the plurality of switching modules based on a plurality of commands generated by the first and second regulator.

8. The power converter of claim 1, wherein the system controller further comprises a modulator configured to control the activation mode of the plurality of switching modules based on a plurality of commands generated by the first, second, third and the fourth regulator.

9. The power converter as recited in claim 1, wherein the controlled electrical variable comprises output power.

10. A power converter, comprising:
    at least one power converter leg, each leg comprising:
    a first string comprising a plurality of controllable semiconductor switches, a first connecting node, and a second connecting node, wherein the first string is operatively coupled across a first bus and a second bus; and
    a second string operatively coupled to the first string via the first connecting node and the second connecting node, wherein the second string comprises a first arm and a second arm having a plurality of switching modules, wherein each of the plurality of switching modules comprises a plurality of fully controllable semiconductor switches and at least one energy storage device;
    a system controller configured to control an activation mode of at least one of the plurality of controllable semiconductor switches from the first string, and a predetermined number of switching modules from the second string such that a controlled electrical variable is maintained at a first predetermined reference voltage value and the average internal stored energy of the energy storage devices are balanced and maintained at a second predetermined reference value; and
    a modulator configured to control the activation mode of the plurality of switching modules based on a plurality of commands generated by a first, second, third and a fourth regulator.

* * * * *